(12) United States Patent
Nagata et al.

(10) Patent No.: US 12,539,886 B2
(45) Date of Patent: Feb. 3, 2026

(54) OPERATION MANAGEMENT APPARATUS, SYSTEM, NON-TRANSITORY COMPUTER READABLE MEDIUM, AND OPERATION MANAGEMENT METHOD

(71) Applicant: TOYOTA JIDOSHA KABUSHIKI KAISHA, Toyota (JP)

(72) Inventors: Yu Nagata, Chofu (JP); Tomoyuki Kozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 18/385,020

(22) Filed: Oct. 30, 2023

(65) Prior Publication Data

US 2024/0140490 A1    May 2, 2024

(30) Foreign Application Priority Data

Nov. 2, 2022  (JP) ................. 2022-176721

(51) Int. Cl.
*B60W 60/00* (2020.01)
*B60W 50/14* (2020.01)

(52) U.S. Cl.
CPC ...... *B60W 60/00253* (2020.02); *B60W 50/14* (2013.01); *B60W 2050/146* (2013.01); *B60W 2540/221* (2020.02); *B60W 2756/10* (2020.02)

(58) Field of Classification Search
None
See application file for complete search history.

(56) References Cited

U.S. PATENT DOCUMENTS

| 2010/0142683 A1* | 6/2010 | Goldman | H04N 19/90 |
| | | | 379/52 |
| 2017/0316696 A1* | 11/2017 | Bartel | B60K 28/06 |

FOREIGN PATENT DOCUMENTS

| JP | 2008-249631 A | 10/2008 |
| JP | 2022-045502 A | 3/2022 |
| JP | 2022-046311 A | 3/2022 |

\* cited by examiner

*Primary Examiner* — Christian Chace
*Assistant Examiner* — Shayne M. Gilbertson
(74) *Attorney, Agent, or Firm* — Dinsmore & Shohl LLP

(57) ABSTRACT

An operation management apparatus operates a plurality of vehicles by autonomous driving. The operation management apparatus includes a controller configured to determine, upon identifying that a reservation holder who has reserved a route on which a plurality of vehicles are operated is a hearing-impaired person, based on reservation data including an attribute of the reservation holder, whether there is a sign language operator capable of sign language among one or more remote operators who perform remote monitoring operations for each vehicle, based on operator data including an attribute of each of the one or more remote operators, and select, according to a result of determination, a dispatch vehicle to dispatch to the route reserved by the reservation holder, from among the plurality of vehicles.

17 Claims, 3 Drawing Sheets

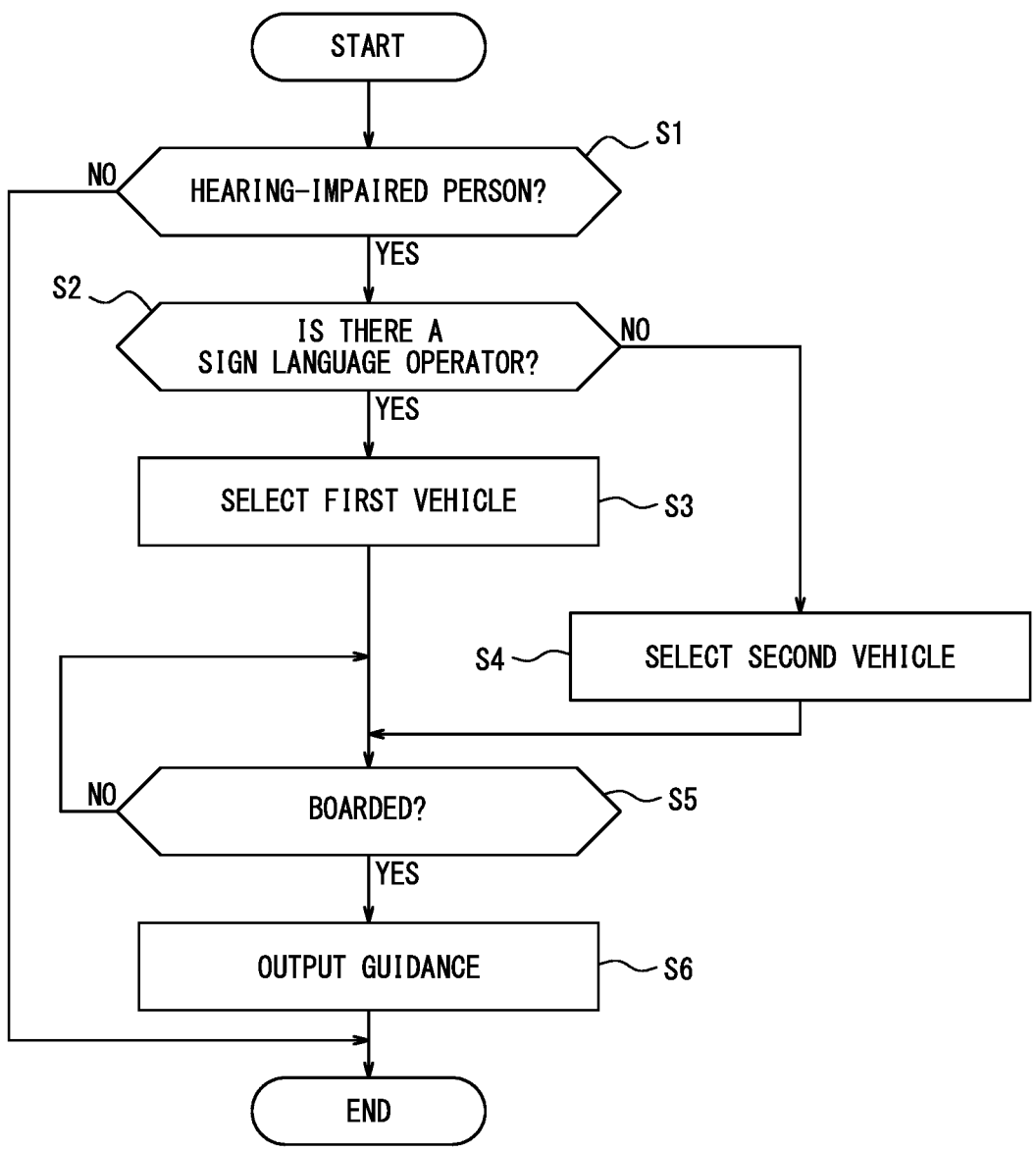

OPERATION MANAGEMENT APPARATUS, SYSTEM, NON-TRANSITORY COMPUTER READABLE MEDIUM, AND OPERATION MANAGEMENT METHOD

CROSS-REFERENCE TO RELATED APPLICATION

This application claims priority to Japanese Patent Application No. 2022-176721 filed on Nov. 2, 2022, the entire contents of which are incorporated herein by reference.

Technical Field

The present disclosure relates to an operation management apparatus, a system, a non-transitory computer readable medium, and an operation management method.

BACKGROUND

Patent Literature (PTL) 1 describes an operation management system in which the operation status of a vehicle is managed by a remote observer.

CITATION LIST

Patent Literature

PTL 1: JP 2022-45502 A

SUMMARY

In a case in which a passenger in an autonomous vehicle is hearing impaired, it may be difficult or impossible for the passenger to hear sound, making it difficult for the passenger to understand guidance from in-vehicle announcements made in the autonomous vehicle. If a problem occurs in an autonomous vehicle, a remote operator who performs remote monitoring of the autonomous vehicle may contact the passengers of the vehicle by voice, such as an in-vehicle announcement of guidance. In this case, it is difficult for the hearing impaired to understand the contact by voice from the remote operator. Additionally, in many cases, communication between vehicle passengers and remote operators is verbal. In such cases as well, it is difficult for the hearing impaired to communicate verbally with the remote operator. In a case in which the guidance is not understood by the hearing-impaired person, or the hearing-impaired person cannot communicate with the remote operator, the hearing-impaired person will not know what is happening and will feel uneasy, which increases the burden on the hearing-impaired person when using autonomous vehicles.

It would be helpful to reduce the burden on the hearing impaired.

An operation management apparatus according to the present disclosure is an operation management apparatus for operating a plurality of vehicles by autonomous driving, the operation management apparatus including:
  a controller configured to determine, upon identifying that a reservation holder who has reserved a route on which the plurality of vehicles is operated is a hearing-impaired person, based on reservation data including an attribute of the reservation holder, whether there is a sign language operator capable of sign language among one or more remote operators who perform remote monitoring operations for each vehicle, based on operator data including an attribute of each of the one or more remote operators, and select, according to a result of determination, a dispatch vehicle to dispatch to the route reserved by the reservation holder, from among the plurality of vehicles.

A program according to the present disclosure is configured to cause a computer functioning as an operation management apparatus for operating a plurality of vehicles by autonomous driving to execute operations, the operations including:
  determining, upon identifying that a reservation holder who has reserved a route on which the plurality of vehicles is operated is a hearing-impaired person, based on reservation data including an attribute of the reservation holder, whether there is a sign language operator capable of sign language among one or more remote operators who perform remote monitoring operations for each vehicle, based on operator data including an attribute of each of the one or more remote operators; and
  selecting, according to a result of determination, a dispatch vehicle to dispatch to the route reserved by the reservation holder, from among the plurality of vehicles.

An operation management method according to the present disclosure is an operation management method for operating a plurality of vehicles by autonomous driving, operation management method including:
  identifying, by a controller, whether a reservation holder who has reserved a route on which the plurality of vehicles is operated is a hearing-impaired person, based on reservation data including an attribute of the reservation holder;
  determining by the controller, upon identifying that the reservation holder is a hearing-impaired person, whether there is a sign language operator capable of sign language among one or more remote operators who perform remote monitoring operations for each vehicle, based on operator data including an attribute of each of the one or more remote operators; and
  selecting by the controller, according to a result of determination, a dispatch vehicle to dispatch to the route reserved by the reservation holder, from among the plurality of vehicles.

According to the present disclosure, the burden on the hearing impaired is reduced.

BRIEF DESCRIPTION OF THE DRAWINGS

In the accompanying drawings:

FIG. 4 is a flowchart illustrating operations of the operation management apparatus according to an embodiment of the present disclosure.

DETAILED DESCRIPTION

Figure 1:
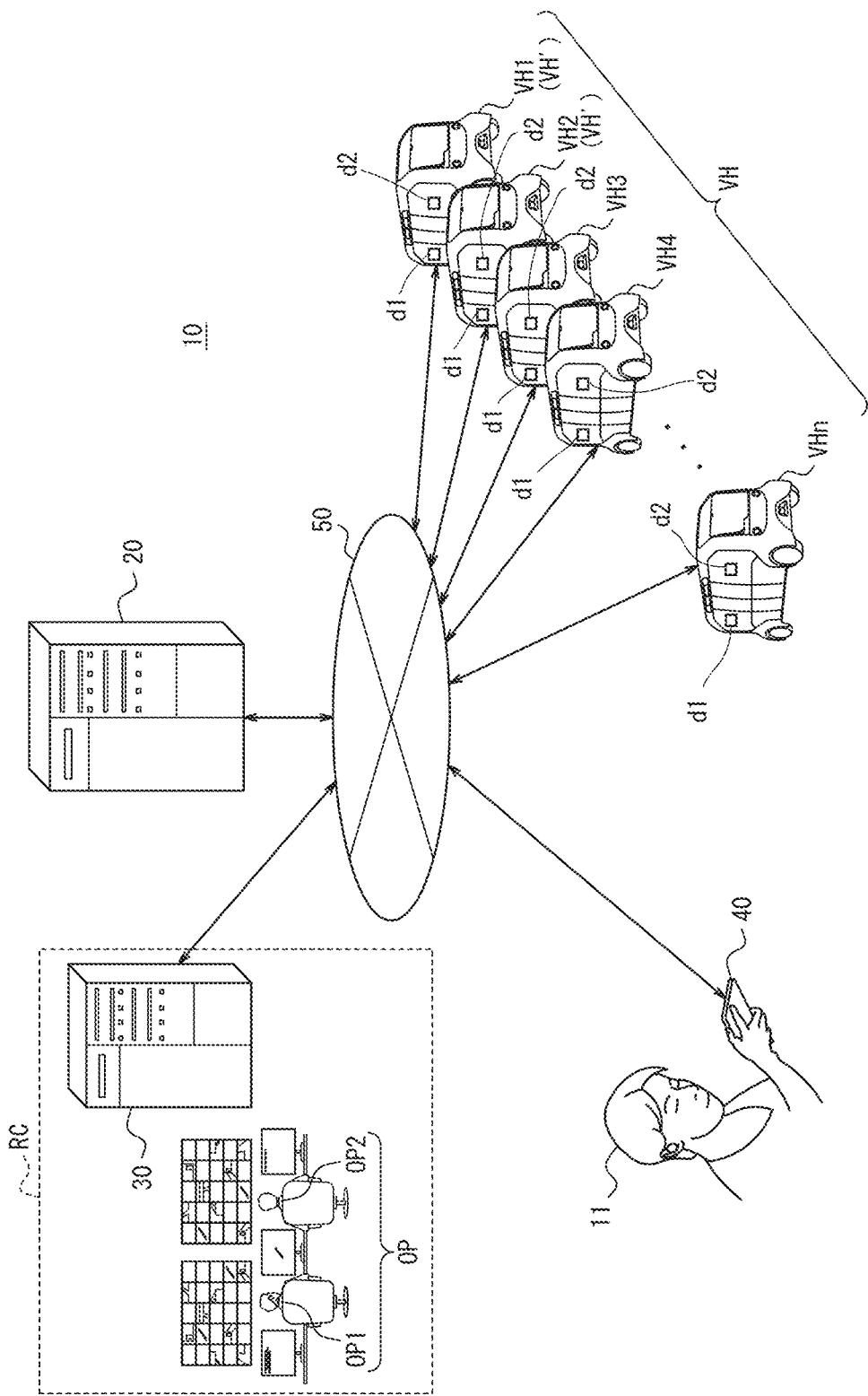
FIG. 1 is a diagram illustrating a configuration of a system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes at least one operation management apparatus 20, at least one server apparatus 30, a plurality of vehicles VH, and at least one terminal apparatus 40. The system 10 is used, for example, to provide a mobility service such as MaaS. The term "MaaS" is an abbreviation of Mobility as a Service.

The operation management apparatus 20 can communicate with the server apparatus 30 and the terminal apparatus 40 via a network 50 such as the Internet. The operation management apparatus 20 may be able to communicate with each vehicle VH via the network 50.

The server apparatus 30 can communicate with each vehicle VH, as well as the operation management apparatus 20, via the network 50. The server apparatus 30 may be able to communicate with the terminal apparatus 40 via the network 50.

The operation management apparatus 20 is installed in a facility, such as a data center for acquiring, storing, and processing data such as vehicle data D1 and reservation data D2, and is operated by an operation manager who manages the system 10. The vehicle data D1 is data that includes information indicating, for each vehicle VH, the type of equipment installed in the vehicle. The reservation data D2 is data that includes an attribute At1 of a reservation holder 11 who intends to use the route on which the plurality of vehicles VH is operated. In the present embodiment, the attribute At1 included in the reservation data D2 registers whether the reservation holder 11 is hearing impaired. In the present embodiment, hearing impairment includes total deafness, i.e., a complete inability to hear sound, and hearing loss, i.e., difficulty in hearing sound. The attribute At1 may register the level of hearing loss of the reservation holder 11. The operation management apparatus 20 is a computer such as a server that belongs to a cloud computing system or other computing system. The operation management apparatus 20 may be installed in a control room of the system 10 and used by the operation manager. Alternatively, the operation management apparatus 20 installed in the control room may be shared by two or more operation managers. In the present embodiment, the operation management apparatus 20 operates the plurality of vehicles VH along a predetermined route by autonomous driving.

The server apparatus 30 is installed in a facility such as a data center. In the present embodiment, the server apparatus 30 is installed in a remote monitoring center RC to remotely monitor autonomous operation of each vehicle VH. In the present embodiment, one or more remote operators OP at the remote monitoring center RC provide remote assistance for the autonomous operation of each vehicle VH. The server apparatus 30 is a computer such as a server that belongs to a cloud computing system or other computing system. The server apparatus 30 acquires, stores, and processes operator data D3 at the remote monitoring center RC. The operator data D3 is data including an attribute At2 of each of one or more remote operators OP. In the present embodiment, the attribute At2 registers whether each remote operator OP is a sign language operator capable of sign language.

The plurality of vehicles VH includes vehicle VH1 through vehicle VHn, where n is a natural number. The number of vehicles VH may be defined freely. Each vehicle VH operates as an on-demand bus in the present embodiment, but the vehicle VH is not limited to this and may be a taxi or the like, as long as the vehicle VH can transport the reservation holder 11 to a destination P1 in response to the reservation by the reservation holder 11. Each vehicle VH can transport one or more passengers. Each vehicle VH is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. Each vehicle VH is a MaaS dedicated vehicle in the present embodiment but may be an AV, the driving of which is automated at any level. The term "AV" is an abbreviation of autonomous vehicle. The automation level is, for example, any one of Level 1 to Level 5 according to the level classification defined by SAE. The name "SAE" is an abbreviation of Society of Automotive Engineers. In the present embodiment, an information processing apparatus is installed in each vehicle VH. The information processing apparatus is, for example, a computer in which autonomous driving control software is installed, or a device capable of carrying sensors such as a camera and lidar, but is not limited thereto and may be any device. The information processing apparatus is installed at any location in the vehicle VH, such as on the roof top of the vehicle VH. In the present embodiment, the information processing apparatus acquires the positional data for the vehicle VH, the name of the stop where the vehicle VH stopped, or information indicating the arrival and departure status of the vehicle VH, and transmits the acquired information to the operation management apparatus 20 as operation status data D4.

The terminal apparatus 40 is held by the reservation holder 11 who reserves the use of the route on which the plurality of vehicles VH is operated. The terminal apparatus 40 is, for example, a mobile device such as a mobile phone, a smartphone, or a tablet, or a PC. The term "PC" is an abbreviation of personal computer. In the present embodiment, the reservation holder 11 is a hearing-impaired person.

The network 50 includes the Internet, at least one WAN, at least one MAN, or a combination thereof. The term "WAN" is an abbreviation of wide area network. The term "MAN" is an abbreviation of metropolitan area network. The network 50 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

In the system 10, the operation management apparatus 20 functions as a mobility service platform. To summarize, the operation management apparatus 20 accepts reservations from a plurality of reservation holders, including the reservation holder 11. The operation management apparatus 20 operates the plurality of vehicles VH on demand based on each reservation. For example, the operation management apparatus 20 selects a dispatch vehicle VH' to be dispatched to the reservation holder 11, from among the plurality of vehicles VH, according to the reservation from the reservation holder 11 and operates the dispatch vehicle VH' by autonomous driving. In the present embodiment, information indicating reservations from a plurality of reservation holders, including the reservation holder 11, is managed by the operation management apparatus 20 as reservation data D2. The reservation data D2 includes, for example, basic information indicating the destination P1, boarding location P2, boarding date and time T1, and the like inputted by each reservation holder; information indicating the attribute At1 of each reservation holder; and the like. The attribute At1 registers whether each reservation holder is hearing impaired. The attribute At1 may register the level of hearing loss of each reservation holder. In the present embodiment, the reservation holder 11 operates the terminal apparatus 40 to reserve the use of the route on which the vehicle VH is operated. Specifically, the reservation holder 11 inputs, to the terminal apparatus 40, a desired destination P1', boarding location P2', boarding date and time T1', and the condition of being hearing impaired as an attribute At1' of the reservation holder 11. The terminal apparatus 40 transmits, to the operation management apparatus 20, the information inputted by the reservation holder 11, as reservation data D2'.

In the present embodiment, one or more remote operators OP at the remote monitoring center RC provide remote assistance for the autonomous operation of each vehicle VH. In other words, the remote operators OP can monitor and remotely control each vehicle VH during autonomous driving. The one or more remote operators OP may include remote operators other than remote operators OP1 and OP2. The remote operators OP also respond to passenger inquiries received during remote assistance for the operation of each vehicle VH. The remote operators OP also provide guidance to the passengers of the vehicle VH in the event of a breakdown or other problem with the vehicle VH.

The operation management apparatus 20 identifies the reservation holder 11 as a hearing-impaired person, based on the reservation data D2' transmitted from the terminal apparatus 40. The operation management apparatus 20 determines whether there is a sign language operator capable of sign language among the one or more remote operators OP, based on the operator data D3 that includes the attribute At2 of each of the one or more remote operators OP. In the present embodiment, the operator data D3 is, for example, transmitted from the server apparatus 30 to the operation management apparatus 20. According to the result of the determination, the operation management apparatus 20 selects the dispatch vehicle VH' to be dispatched to the route reserved by the reservation holder 11, from among the plurality of vehicles VH. In the present embodiment, the selection of the dispatch vehicle VH' by the operation management apparatus 20 is based on the vehicle data D1. The vehicle data D1 includes information indicating, for each of the plurality of vehicles VH, the type of equipment installed in the vehicle. The type of equipment installed in the vehicle VH includes a first device d1 and a second device d2. The first device d1 is a device that supports sign language communication between the reservation holder 11 and the sign language operator. Specifically, the first device d1 includes an imaging apparatus that captures an image of the reservation holder 11 and a display apparatus that displays an image or video of the sign language operator. The imaging apparatus is, for example, a camera or monitor. The display apparatus is, for example, a display. The second device d2 is a device that supports non-sign language communication between the reservation holder 11 and the remote operator OP. Specifically, the second device d2 is a writing device or writing tablet for realizing conversation by writing. In a case in which it is determined that there is a sign language operator, the operation management apparatus 20 refers to the vehicle data D1 and selects a first vehicle VH1 which has the first device d1 installed therein, as the dispatch vehicle VH'. Conversely, in a case in which it is determined that there is no sign language operator, the operation management apparatus 20 refers to the vehicle data D1 and selects a second vehicle VH2, which has the second device d2 installed therein, as the dispatch vehicle VH'.

According to the present embodiment, in a case in which the reservation holder 11 is a hearing-impaired person, it is determined whether there is a sign language operator capable of sign language among one or more remote operators OP who perform remote monitoring operations for each vehicle. According to the result of the determination, a dispatch vehicle VH' is then selected from among the plurality of vehicles VH. Specifically, in a case in which it is determined that there is a sign language operator, the first vehicle VH1 having installed therein the first device d1 that supports sign language communication between the reservation holder 11 and the sign language operator is selected as the dispatch vehicle VH'. Conversely, in a case in which it is determined that there is no sign language operator, the second vehicle VH2 having installed therein the second device d2 that supports non-sign language communication between the reservation holder 11 and the remote operator OP is selected as the dispatch vehicle VH'. In other words, in a case in which the reservation holder 11 is a hearing-impaired person, the technique for communication between the remote operator OP and the reservation holder 11 in the dispatch vehicle VH' is changed to a different technique than usual. A suitable technique for the reservation holder 11 is thereby provided as the technique for communication between the reservation holder 11 and the remote operator OP. The reservation holder 11 can therefore easily communicate with the remote operator OP, which reduces anxiety and improves convenience when hearing-impaired people ride in autonomous vehicles. Consequently, the burden on the hearing impaired is reduced.

Figure 2:
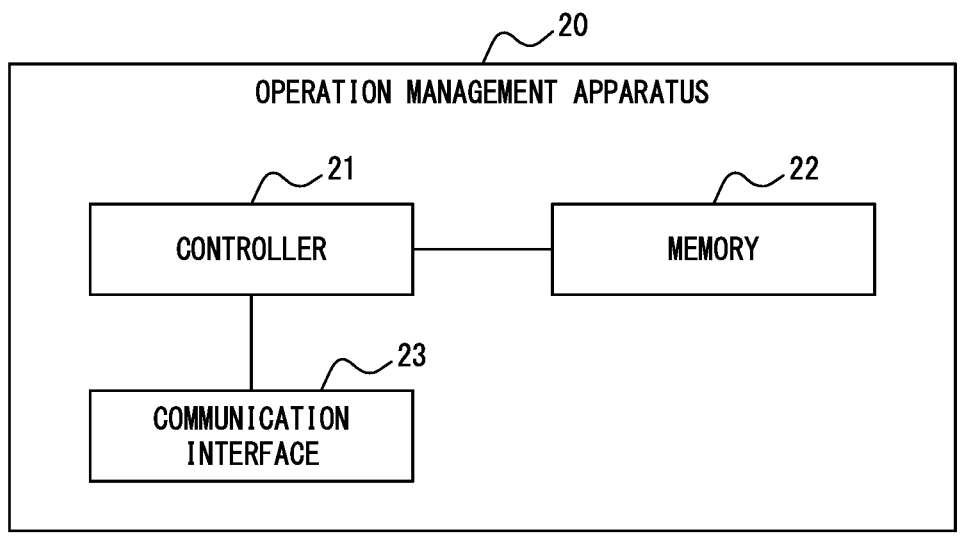
FIG. 2 is a block diagram illustrating a configuration of an operation management apparatus according to an embodiment of the present disclosure.

A configuration of the operation management apparatus 20 according to the present embodiment will be described with reference to FIG. 2.

The operation management apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the operation management apparatus 20 while controlling components of the operation management apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the operation management apparatus 20 and data obtained by the operations of the operation management apparatus 20. In the present embodiment, the vehicle data D1, reservation data D2, or operator data D3 may be stored in the memory 22.

The communication interface 23 includes at least one interface for communication. The interface for communication is, for example, a LAN interface. The communication interface 23 receives data to be used for the operations of the operation management apparatus 20, and transmits data obtained by the operations of the operation management apparatus 20. In the present embodiment, the communication interface 23 communicates with the server apparatus 30 and the terminal apparatus 40. The communication interface 23 may communicate with each vehicle VH. For example, the controller 21 may receive the vehicle data D1 from each vehicle VH via the communication interface 23. The controller 21 may receive the reservation data D2 from the terminal apparatus 40 via the communication interface 23. The controller 21 may receive the operator data D3 from the server apparatus 30 via the communication interface 23.

The functions of the operation management apparatus 20 are realized by execution of a program according to the present embodiment by a processor serving as the controller 21. That is, the functions of the operation management apparatus 20 are realized by software. The program causes a computer to execute the operations of the operation management apparatus 20, thereby causing the computer to function as the operation management apparatus 20. That is, the computer executes the operations of the operation management apparatus 20 in accordance with the program to thereby function as the operation management apparatus 20.

The program may be stored in a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the operation management apparatus 20 may be realized by a programmable circuit or a dedicated circuit serving as the controller 21. That is, some or all of the functions of the operation management apparatus 20 may be realized by hardware.

Figure 3:
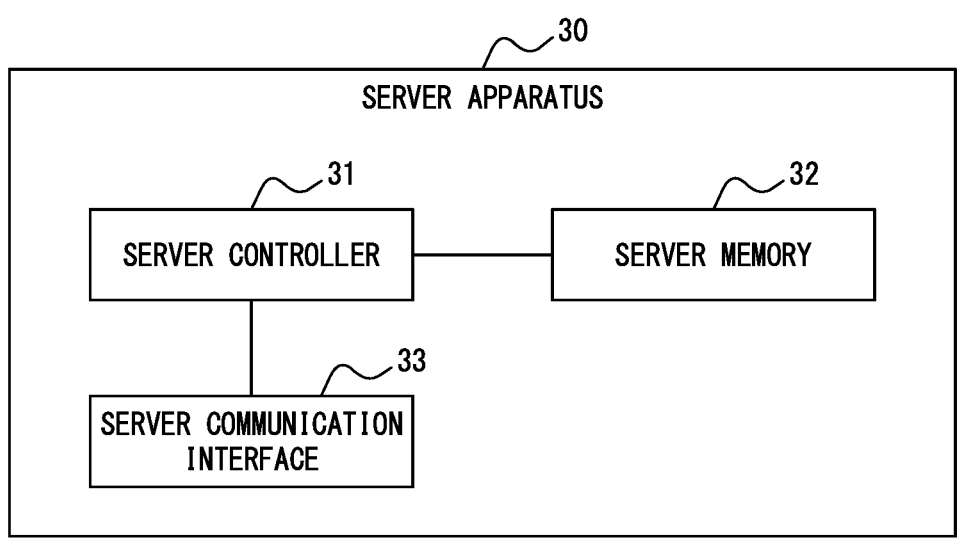
FIG. 3 is a block diagram illustrating a configuration of a server apparatus according to an embodiment of the present disclosure.

A configuration of the server apparatus 30 according to the present embodiment will be described with reference to FIG. 3.

The server apparatus 30 includes a server controller 31, a server memory 32, and a server communication interface 33.

The server controller 31 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The server controller 31 executes processes related to operations of the server apparatus 30 while controlling components of the server apparatus 30.

The server memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The server memory 32 functions as, for example, a main memory, an auxiliary memory, or a cache memory. The server memory 32 stores data to be used for the operations of the server apparatus 30 and data obtained by the operations of the server apparatus 30. In the present embodiment, the operator data D3 may be stored in the server memory 32.

The server communication interface 33 includes at least one interface for communication. The interface for communication is, for example, a LAN interface. The server communication interface 33 receives data to be used for the operations of the server apparatus 30, and transmits data obtained by the operations of the server apparatus 30. In the present embodiment, the server communication interface 33 communicates with the operation management apparatus 20 and each vehicle VH. The server controller 31 may receive the vehicle data D1 from each vehicle VH via the server communication interface 33. The server controller 31 may have the vehicle data D1 constructed as a database in the server memory 32. The server communication interface 33 may communicate with the terminal apparatus 40.

Some or all of the functions of the server apparatus 30 may be realized by a programmable circuit or a dedicated circuit serving as the server controller 31. That is, some or all of the functions of the server apparatus 30 may be realized by hardware.

Operations of the operation management apparatus 20 according to the present embodiment will be described with reference to FIG. 4. These operations correspond to an operation management method according to the present embodiment.

In step S1, the controller 21 of the operation management apparatus 20 identifies whether the reservation holder 11 who has reserved the use of the route on which the plurality of vehicles VH is operated is a hearing-impaired person, based on the reservation data D2' including the attribute At1' of the reservation holder 11. The reservation data D2' may be acquired by any procedure, such as by the following.

In the present embodiment, the terminal apparatus 40 of the reservation holder 11 accepts input of the reservation data D2' made by the reservation holder 11. Specifically, the terminal apparatus 40 accepts an operation by which the reservation holder 11 inputs a desired destination P1', boarding location P2', and boarding date and time T1', and the reservation holder 11 being a hearing-impaired person as an attribute At1' of the reservation holder 11, via an input interface such as a touch screen or a microphone. Furthermore, the terminal apparatus 40 may accept an operation by which the reservation holder 11 inputs the level of hearing loss. The terminal apparatus 40 transmits, to the operation management apparatus 20, information indicating each item inputted by the reservation holder 11, as reservation data D2'. The controller 21 of the operation management apparatus 20 receives, via the communication interface 23, the reservation data D2' transmitted from the terminal apparatus 40 to acquire the received reservation data D2'. The controller 21 stores the acquired reservation data D2' in the memory 22.

The controller 21 of the operation management apparatus 20 reads the reservation data D2' stored in the memory 22 and identifies the reservation holder 11 as a hearing-impaired person based on the read reservation data D2'. When the reservation holder 11 is identified as a hearing-impaired person in step S1, the process of step S2 is executed. Conversely, when the reservation holder 11 is identified as not being a hearing-impaired person in step S1, the processing flow in FIG. 4 ends.

In step S2, the controller 21 of the operation management apparatus 20 determines, based on the operator data D3, whether there is a sign language operator capable of sign language among the one or more remote operators OP. The operator data D3 is data including an attribute At2 of each of one or more remote operators OP. As described above, in the present embodiment, the attribute At2 registers whether each remote operator OP is capable of sign language.

The operator data D3, which may be acquired by any procedure, is acquired by, for example, the following procedure in the present embodiment. One or more remote operators OP each input information indicating whether they are capable of sign language, as a registration item to the server apparatus 30 located at the remote monitoring center RC. The server apparatus 30 accepts, as input of the attribute At2, the input of the registration item by each remote operator OP. Specifically, the server apparatus 30 accepts an operation by which each remote operator OP uses an input interface, such as a touch screen or microphone, to input, as the registration item, that the remote operator OP is capable of sign language. The server apparatus 30 includes, as the attribute At2, the registration item inputted by the remote operator OP in the operator data D3. The server apparatus 30 transmits the operator data D3 to the operation management apparatus 20 via the server communication interface 33. The controller 21 of the operation management apparatus 20 receives, via the communication interface 23, the operator data D3 transmitted from the server apparatus 30, to thereby acquire the received operator data D3. The controller 21 stores the acquired operator data D3 in the memory 22.

The controller 21 of the operation management apparatus 20 reads the operator data D3 stored in the memory 22 and determines whether there is a sign language operator capable of sign language among the one or more remote operators OP, based on the attribute At2 included in the read operator data D3.

In a case in which it is determined in step S2 that there is a sign language operator, the process of step S3 is executed. Conversely, in a case in which it is determined in step S2 that there is no sign language operator, the process of step S4 is executed.

In step S3, the controller 21 of the operation management apparatus 20 selects the first vehicle VH1, which has the first device d1 installed therein, as the dispatch vehicle VH' to dispatch to the route reserved by the reservation holder 11. The first device d1 is a device that supports sign language communication between the reservation holder 11 and the sign language operator. Specifically, the controller 21 of the operation management apparatus 20 refers to the vehicle data D1 and selects a vehicle VH which has the first device d1 installed therein, as the first vehicle VH1. As described above, the vehicle data D1 includes information indicating, for each vehicle VH, the type of equipment installed in the vehicle. In the present embodiment, the first device d1 includes an imaging apparatus that captures images of the reservation holder 11 and a display apparatus that displays images or video of the sign language operator. The imaging apparatus includes, for example, a camera or monitor. The display apparatus includes, for example, a display. However, the first device d1 is not limited to these examples and may be any device that supports sign language communication between the reservation holder 11 and the sign language operator. The first device d1 is installed to be useable at one or more seats in the dispatch vehicle VH'.

In step S4, the controller 21 of the operation management apparatus 20 selects the second vehicle VH2 which has the second device d2 installed therein, as the dispatch vehicle VH'. The second device d2 is a device that supports non-sign language communication between the reservation holder 11 and the remote operator OP. Specifically, the controller 21 of the operation management apparatus 20 refers to the vehicle data D1 and selects a vehicle VH which has the second device d2 installed therein, as the second vehicle VH2. In the present embodiment, the second device d2 includes a writing device or writing tablet for realizing conversation by writing. However, the second device d2 is not limited to such a writing device and may be any device that supports non-sign language communication between the reservation holder 11 and the remote operator OP. The second device d2 is installed to be useable at one or more seats in the dispatch vehicle VH'.

In step S5, the controller 21 of the operation management apparatus 20 determines whether the reservation holder 11 has boarded the dispatch vehicle VH'. The determination of whether the reservation holder 11 has boarded the dispatch vehicle VH' may be made by any appropriate procedure. In the present embodiment, the controller 21 determines whether the reservation holder 11 has boarded the dispatch vehicle VH' based on the result of recognizing, using facial recognition, one or more passengers who board the dispatch vehicle VH'. Specifically, when inputting the reservation data D2' into the terminal apparatus 40, the reservation holder 11 registers a facial image F of the reservation holder 11. The terminal apparatus 40 transmits the facial image F registered by the reservation holder 11 to the operation management apparatus 20 together with the reservation data D2'. The controller 21 of the operation management apparatus 20 receives, via the communication interface 23, the facial image F of the reservation holder 11 and the reservation data D2' transmitted from the terminal apparatus 40, to thereby acquire the received facial image F and reservation data D2'. The controller 21 stores the acquired facial image F in association with the reservation data D2' in the memory 22.

The controller 21 of the operation management apparatus 20 acquires captured images of one or more passengers who board the dispatch vehicle VH'. Specifically, the controller 21 receives, via the communication interface 23, images of the interior of the dispatch vehicle VH' from the information processing apparatus installed in the dispatch vehicle VH', the images having been captured by a camera or other sensor included in the information processing apparatus. The controller 21 uses facial recognition technology to determine whether the facial image F of the reservation holder 11 matches a face of the people on board the dispatch vehicle VH' in the received images. In the case of matching, the controller 21 determines that the reservation holder 11 has boarded the dispatch vehicle VH'. Here, instead of the controller 21 of the operation management apparatus 20 making the determination based on facial recognition, the information processing apparatus may make the determination based on facial recognition. As a variation of the present embodiment, the controller 21 of the operation management apparatus 20 may acquire an ID' of the reservation holder 11 in advance instead of the facial image F of the reservation holder 11, and compare the ID presented by one or more passengers who board the dispatch vehicle VH' with the ID' acquired in advance, to thereby determine that the reservation holder 11 has boarded the dispatch vehicle VH'. The term "ID" is an abbreviation of identifier. Here, instead of the controller 21 comparing the IDs to make a determination, the information processing apparatus may compare the IDs to make a determination. Alternatively, as another variation of the present embodiment, the controller 21 of the operation management apparatus 20 may determine that the reservation holder 11 has boarded the dispatch vehicle VH' by determining that the dispatch vehicle VH' has arrived at the boarding location P2' on the boarding date and time T1' indicated in the reservation data D2'. The controller 21 may determine that the dispatch vehicle VH' has arrived at the boarding location P2' on the boarding date and time T1' indicated in the reservation data D2', based on positional data for the dispatch vehicle VH' indicated by operation status data D4' transmitted from the information processing apparatus installed in the dispatch vehicle VH', or based on information indicating the name of the stop at which the dispatch vehicle VH' stopped or the arrival and departure status of the dispatch vehicle VH'.

The process in step S5 is repeated until it is determined by the controller 21 that the reservation holder 11 has boarded the dispatch vehicle VH'. Once it is determined by the controller 21 in step S5 that the reservation holder 11 has boarded the dispatch vehicle VH', the process of step S6 is executed.

In step S6, the controller 21 of the operation management apparatus 20 performs control to output guidance G for the reservation holder 11 to sit in a seat X at which the first device d1 or the second device d2 is useable. The guidance G includes audio guidance G1 or guidance G2 by characters or signs. The guidance G may be outputted by any appropriate technique. For example, the controller 21 controls an output apparatus such as a speaker included in the dispatch vehicle VH', to output a message M1 "Please be seated in the seat X" as the guidance G1. In the present embodiment, the speaker as an output apparatus is a directional speaker. However, the speaker is not limited to a directional speaker and may be a non-directional speaker. Alternatively, the controller 21 may control an output apparatus such as signage provided in the dispatch vehicle VH' to output the message M1 in characters as the guidance G2. Alternatively, a light emitting element or the like may be installed in the seat X as the output apparatus, and the controller 21 may control the flashing of the light emitting element. The controller 21 thus controls an output apparatus to output the guidance G2 by signs, as the guidance G. The reservation holder 11 perceives this visual information and is guided to the seat X. In addition to the guidance G, the controller 21 may also perform control to output a message M2 as an in-vehicle announcement requesting that the passengers around the reservation holder 11 vacate the seat X.

As described above, in the present embodiment, the controller 21 of the operation management apparatus 20 detects that a hearing-impaired person has boarded the vehicle and provides the guidance G in the autonomous vehicle in a different way than usual. When a hearing-impaired person boards, the technique for communication with the remote monitoring operator is thus changed to a different technique than usual.

According to the present embodiment, techniques that are suitable for the hearing impaired are provided as techniques for communication between a hearing-impaired person and the remote operator OP in an autonomous vehicle. In other words, when a hearing-impaired person boards, a sign language operator capable of sign language is assigned as the remote operator OP, and a vehicle VH having the first device d1, such as a camera and monitor, installed therein is assigned as the dispatch vehicle VH'. Alternatively, in a case in which a sign language operator cannot be assigned, a vehicle VH having the second device d2, such as a writing device, writing tablet, or other device capable of realizing conversation by writing, installed therein is assigned as the dispatch vehicle VH'. Thus, even if the reservation holder 11 is a hearing-impaired person, the reservation holder 11 can easily communicate with the remote operator OP. The anxiety of hearing-impaired people, such as those with hearing loss, is therefore reduced, and the convenience is improved when hearing-impaired people ride in autonomous vehicles. In this way, the burden on the hearing impaired is reduced.

As a variation of the present embodiment, the attribute At1 of each reservation holder included in the reservation data D2 may further register the level of hearing loss of each reservation holder. In a case in which it is determined, in step S5, that the reservation holder 11 has boarded the dispatch vehicle VH', the controller 21 of the operation management apparatus 20 may identify the level of hearing loss of the reservation holder 11 based on the reservation data D2'. The controller 21 may perform control to adjust the output format of the guidance G according to the identified level of hearing loss. Specifically, in a case in which the guidance G is audio guidance G1, the controller 21 may perform control to adjust the output format of the guidance G by performing control to increase the volume of the guidance G1 as the level of hearing loss registered as the attribute At1 included in the reservation data D2 is higher. The level of hearing loss is generally classified into four levels based on the loudness dB of audible sound: "mild hearing loss", in which no sound from 25 dB up to 40 dB is heard; "moderate hearing loss", in which no sound from 40 dB up to 70 dB is heard; "severe hearing loss", in which no sound from 70 dB up to 90 dB is heard; and "profound hearing loss", in which no sound from 90 dB up is heard. The term "dB" is an abbreviation of decibel. Here, the case of being able to hear sound below 25 dB is "normal". The controller 21 sets the volume of the guidance G1 to 40 dB or higher in the case of the level being "mild hearing loss". The controller 21 sets the volume of the guidance G1 to 70 dB or higher in the case of the level being "moderate hearing loss". The controller 21 sets the volume of the guidance G1 to 90 dB or higher in the case of the level being "severe hearing loss" or "profound hearing loss". In a case in which the level of hearing loss is "severe hearing loss" or "profound hearing loss", the controller 21 may add vibration in addition to or instead of setting the volume of the guidance G1 to 90 dB or higher. The reason is that an excessively loud volume may sound noisy for other passengers with normal hearing. Another reason is that in a case in which the level of hearing loss of the reservation holder 11 is "severe hearing loss" or "profound hearing loss", the reservation holder 11 may still not be able to hear even if the volume is 90 dB or higher.

As another example of the present variation, in a case in which the guidance G is guidance G2 by characters, the controller 21 of the operation management apparatus 20 may perform control to adjust the output format of the guidance G by performing control to lengthen the display time of the guidance G2 as the level of hearing loss registered as the attribute At1 included in the reservation data D2 is higher. Specifically, the controller 21 may perform control to adjust the output format of the guidance G by performing control to increase the display time of the guidance G2 by N seconds for each increase of one level of hearing loss. Alternatively, the controller 21 may perform control to adjust the output format of the guidance G by performing control to increase the number of instances of display of the guidance G2 as the level of hearing loss is higher. Specifically, the controller 21 may increase the number of instances of display of the guidance G2 by n times for each increase of one level of hearing loss registered as the attribute At1 included in the reservation data D2. In a case in which the guidance G is guidance G2 by signs and is outputted by flashing of a light emitting element provided as an output apparatus in the seat X, the controller 21 may increase the number of instances of display by increasing the flashing cycle of the guidance G2 per unit time for each increase of one level of hearing loss.

According to this configuration, the volume of the guidance G1 is increased, or the display time or number of instances of display of the guidance G2 is increased, depending on the degree of hearing loss of the reservation holder 11. The reservation holder 11 is therefore more likely to notice the guidance G. This further reduces anxiety and improves convenience when hearing-impaired people ride in autonomous vehicles. Consequently, the burden on the hearing impaired is further reduced.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

For example, in a case in which it is determined in step S5 that the reservation holder 11 has boarded, the controller 21 of the operation management apparatus 20 may further determine whether the reservation holder 11 has boarded near a device such as the first device d1 or the second device d2. Any procedure may be used to determine whether the reservation holder 11 has boarded near a device. The following procedure, for example, may be used. The controller 21 acquires captured images of the interior of the dispatch vehicle VH'. Specifically, as the captured images of the interior of the dispatch vehicle VH', the controller 21 receives, via the communication interface 23, images of one or more passengers who have boarded the dispatch vehicle VH' from the information processing apparatus installed in the dispatch vehicle VH', the images having been captured by a camera or other sensor included in the information processing apparatus. The controller 21 determines whether the reservation holder 11 has boarded near a device by analyzing the received images. The controller 21 may then execute step S6 in a case in which it is determined that the reservation holder 11 has not boarded near the device.

The controller 21 of the operation management apparatus 20 may also identify the level of hearing loss of the reservation holder 11 and perform control not only to adjust the output format of the guidance G according to the identified level of hearing loss, but also to adjust the output format of normal in-vehicle announcements or signage in the same manner. In a case in which the reservation holder 11 is identified in step S1 as a hearing-impaired person, the controller 21 of the operation management apparatus 20 may perform control to increase the volume of normal in-vehicle announcements or to lengthen the display time of signage. Alternatively, in a case in which the reservation holder 11 is identified in step S1 as a hearing-impaired person, the controller 21 may perform control to adjust the output format of outside announcements that inform passengers outside the vehicle of the arrival of the dispatch vehicle VH'. Specifically, the controller 21 may perform control to increase the volume of the outside announcements of the dispatch vehicle VH' when the distance between the boarding location P2' and the dispatch vehicle VH' becomes less than a threshold on the boarding date and time T1' indicated in the reservation data D2', i.e., when the dispatch vehicle VH' is approaching the boarding location P2'. The controller 21 may determine whether the dispatch vehicle VH' is approaching the boarding location P2' on the boarding date and time T1' indicated in the reservation data D2' based on positional data for the dispatch vehicle VH', indicated by the operation status data D4' transmitted from the information processing apparatus, or based on information indicating the name of the stop at which the dispatch vehicle VH' stopped or the arrival and departure status of the dispatch vehicle VH'.

For example, the operation management apparatus 20 may be installed in each vehicle VH as a conductor system. Although the operation management apparatus 20 and the server apparatus 30 are separate apparatuses in the present embodiment, the functions of both the operation management apparatus 20 and the server apparatus 30 may be implemented on a single control apparatus.

Examples of some embodiments of the present disclosure are described below. However, it should be noted that the embodiments of the present disclosure are not limited to these examples.

[Appendix 1] An operation management apparatus for operating a plurality of vehicles by autonomous driving, the operation management apparatus comprising:

a controller configured to determine, upon identifying that a reservation holder who has reserved a route on which the plurality of vehicles is operated is a hearing-impaired person, based on reservation data including an attribute of the reservation holder, whether there is a sign language operator capable of sign language among one or more remote operators who perform remote monitoring operations for each vehicle, based on operator data including an attribute of each of the one or more remote operators, and select, according to a result of determination, a dispatch vehicle to dispatch to the route reserved by the reservation holder, from among the plurality of vehicles.

[Appendix 2] The operation management apparatus according to appendix 1, wherein the controller is configured to select, as the dispatch vehicle, a first vehicle having installed therein a first device configured to support sign language communication between the reservation holder and the sign language operator in a case in which it is determined that there is a sign language operator, and the controller is configured to select, as the dispatch vehicle, a second vehicle having installed therein a second device configured to support non-sign language communication between the reservation holder and the remote operator in a case in which it is determined that there is no sign language operator.

[Appendix 3] The operation management apparatus according to appendix 1 or 2, wherein
the first device or the second device is installed to be useable at one or more seats in the dispatch vehicle, and
the controller is configured to determine whether the reservation holder has boarded the dispatch vehicle, and in a case in which it is determined that the reservation holder has boarded, perform control to output guidance for the reservation holder to sit in a seat at which the first device or the second device is useable.

[Appendix 4] The operation management apparatus according to any one of appendices 1 to 3, wherein
the first device includes an imaging apparatus configured to capture an image of the reservation holder and a display apparatus configured to display an image or video of the sign language operator, and
the second device includes a writing device.

[Appendix 5] The operation management apparatus according to any one of appendices 1 to 4, wherein the controller is configured to recognize, using facial recognition, one or more passengers who board the dispatch vehicle and determine, based on a result of recognition, whether the reservation holder has boarded the dispatch vehicle.

[Appendix 6] The operation management apparatus according to any one of appendices 1 to 5, wherein
the attribute of the reservation holder included in the reservation data registers a level of hearing loss of the reservation holder, and
the controller is configured to identify, in a case in which it is determined that the reservation holder has boarded the dispatch vehicle, the level of hearing loss of the reservation holder, based on the reservation data and perform control to adjust an output format of the guidance according to the identified level of hearing loss.

[Appendix 7] The operation management apparatus according to any one of appendices 1 to 6, wherein
the guidance is audio guidance, and
the controller is configured to perform control to adjust the output format by increasing volume of the audio guidance as the level of hearing loss is higher.

[Appendix 8] The operation management apparatus according to any one of appendices 1 to 7, wherein
the guidance is guidance by characters or signs, and
the controller is configured to perform control to adjust the output format by lengthening a display time or increasing a number of instances of display of the guidance by characters or signs as the level of hearing loss is higher.

[Appendix 9] A system comprising:
the operation management apparatus according to any one of appendices 1 to 8; and
a terminal apparatus of the reservation holder, the terminal apparatus being configured to accept input of reservation data in which the reservation holder is registered as a hearing-impaired person as an attribute of the reservation holder and transmit inputted reservation data to the operation management apparatus.

[Appendix 10] A program configured to cause a computer functioning as an operation management apparatus for operating a plurality of vehicles by autonomous driving to execute operations, the operations comprising:
determining, upon identifying that a reservation holder who has reserved a route on which the plurality of vehicles is operated is a hearing-impaired person, based on reservation data including an attribute of the reservation holder, whether there is a sign language operator capable of sign language among one or more remote operators who perform remote monitoring operations for each vehicle, based on operator data including an attribute of each of the one or more remote operators; and
selecting, according to a result of determination, a dispatch vehicle to dispatch to the route reserved by the reservation holder, from among the plurality of vehicles.

[Appendix 11] The program according to appendix 10, wherein the selecting of the dispatch vehicle comprises selecting, as the dispatch vehicle, a first vehicle having installed therein a first device configured to support sign language communication between the reservation holder and the sign language operator in a case in which it is determined that there is a sign language operator, and selecting, as the dispatch vehicle, a second vehicle having installed therein a second device configured to support non-sign language communication between the reservation holder and the remote operator in a case in which it is determined that there is no sign language operator.

[Appendix 12] The program according to appendix 10 or 11, wherein
the first device or the second device is installed to be useable at one or more seats in the dispatch vehicle, and
the operations further comprise:
determining whether the reservation holder has boarded the dispatch vehicle; and
in a case in which it is determined that the reservation holder has boarded the dispatch vehicle, outputting guidance for the reservation holder to sit in a seat at which the first device or the second device is useable.

[Appendix 13] The program according to any one of appendices 10 to 12, wherein the determining comprises recognizing, using facial recognition, one or more passengers who board the dispatch vehicle and determining, based on a result of recognition, whether the reservation holder has boarded the dispatch vehicle.

[Appendix 14] The program according to any one of appendices 10 to 13, wherein
the attribute of the reservation holder included in the reservation data registers a level of hearing loss of the reservation holder, and
the operations further comprise:
identifying, in a case in which it is determined that the reservation holder has boarded the dispatch vehicle, the level of hearing loss of the reservation holder, based on the reservation data; and
adjusting an output format of the guidance according to the identified level of hearing loss.

[Appendix 15] The program according to any one of appendices 10 to 14, wherein
the guidance is audio guidance, and
the adjusting of the output format comprises increasing volume of the audio guidance as the level of hearing loss is higher.

[Appendix 16] The program according to any one of appendices 10 to 15, wherein the guidance is guidance by characters or signs, and
the adjusting of the output format comprises lengthening a display time or increasing a number of instances of display of the guidance by characters or signs as the level of hearing loss is higher.

[Appendix 17] An operation management method for operating a plurality of vehicles by autonomous driving, operation management method comprising:
identifying, by a controller, whether a reservation holder who has reserved a route on which the plurality of vehicles is operated is a hearing-impaired person, based on reservation data including an attribute of the reservation holder;
determining by the controller, upon identifying that the reservation holder is a hearing-impaired person, whether there is a sign language operator capable of sign language among one or more remote operators who perform remote monitoring operations for each vehicle, based on operator data including an attribute of each of the one or more remote operators; and
selecting by the controller, according to a result of determination, a dispatch vehicle to dispatch to the route reserved by the reservation holder, from among the plurality of vehicles.

[Appendix 18] The operation management method according to appendix 17, wherein the selecting of the dispatch vehicle comprises selecting by the controller, as the dispatch vehicle, a first vehicle having installed therein a first device configured to support sign language communication between the reservation holder and the sign language operator in a case in which it is determined that there is a sign language operator, and selecting, as the dispatch vehicle, a second vehicle having installed therein a second device configured to support non-sign language communication between the reservation holder and the remote operator in a case in which it is determined that there is no sign language operator.

[Appendix 19] The operation management method according to appendix 17 or 18, wherein
the first device or the second device is installed to be useable at one or more seats in the dispatch vehicle, and
the operation management method further comprises:
determining, by the controller, whether the reservation holder has boarded the dispatch vehicle; and
in a case in which it is determined that the reservation holder has boarded the dispatch vehicle, outputting, by the controller, guidance for the reservation holder to sit in a seat at which the first device or the second device is useable.

[Appendix 20] The operation management method according to any one of appendices 17 to 19, wherein the determining of whether the reservation holder has boarded the dispatch vehicle comprises recognizing by the controller, using facial recognition, one or more passengers who board the dispatch vehicle and determining based on a result of recognition.

The invention claimed is:

1. An operation management apparatus comprising:
a processor configured to:
operate a plurality of vehicles by autonomous driving;
determine, upon identifying that a reservation holder who has reserved a route on which the plurality of vehicles is operated is a hearing-impaired person, based on reservation data including an attribute of the reservation holder, whether there is a sign language operator capable of sign language among one or more remote operators who perform remote monitoring operations for each vehicle, based on operator data including an attribute of each of the one or more remote operators, and select, according to a result of determination, a dispatch vehicle to dispatch to the route reserved by the reservation holder, from among the plurality of vehicles; and
select, as the dispatch vehicle, a first vehicle having installed therein a first device having a camera configured to support sign language communication between the reservation holder and the sign language operator in a case in which it is determined that there is a sign language operator, and the processor is configured to select, as the dispatch vehicle, a second vehicle having installed therein a second device having a writing device configured to support non-sign language communication between the reservation holder and the remote operator in a case in which it is determined that there is no sign language operator.

2. The operation management apparatus according to claim 1, wherein
the first device or the second device is installed to be useable at one or more seats in the dispatch vehicle, and
the processor is configured to determine whether the reservation holder has boarded the dispatch vehicle, and in a case in which it is determined that the reservation holder has boarded, perform control to output guidance for the reservation holder to sit in a seat at which the first device or the second device is useable.

3. The operation management apparatus according to claim 1, wherein the camera is configured to capture an image of the reservation holder and a display apparatus configured to display an image or video of the sign language operator.

4. The operation management apparatus according to claim 2, wherein the processor is configured to recognize, using facial recognition, one or more passengers who board the dispatch vehicle and determine, based on a result of recognition, whether the reservation holder has boarded the dispatch vehicle.

5. The operation management apparatus according to claim 2, wherein
the attribute of the reservation holder included in the reservation data registers a level of hearing loss of the reservation holder, and
the processor is configured to identify, in a case in which it is determined that the reservation holder has boarded the dispatch vehicle, the level of hearing loss of the reservation holder, based on the reservation data and perform control to adjust an output format of the guidance according to the identified level of hearing loss.

6. The operation management apparatus according to claim 5, wherein
the guidance is audio guidance, and
the processor is configured to perform control to adjust the output format by increasing volume of the audio guidance as the level of hearing loss is higher.

7. The operation management apparatus according to claim 6, wherein
the guidance is guidance by characters or signs, and
the processor is configured to perform control to adjust the output format by lengthening a display time or increasing a number of instances of display of the guidance by characters or signs as the level of hearing loss is higher.

8. A system comprising:
the operation management apparatus according to claim 1; and
a computer of the reservation holder, the computer being configured to accept input of reservation data in which the reservation holder is registered as a hearing-impaired person as an attribute of the reservation holder and transmit inputted reservation data to the operation management apparatus.

9. A non-transitory computer readable medium storing a program configured to cause a computer functioning as an operation management apparatus for operating a plurality of vehicles by autonomous driving to execute operations, the operations comprising:
determining, upon identifying that a reservation holder who has reserved a route on which the plurality of vehicles is operated is a hearing-impaired person, based on reservation data including an attribute of the reservation holder, whether there is a sign language operator capable of sign language among one or more remote operators who perform remote monitoring operations for each vehicle, based on operator data including an attribute of each of the one or more remote operators; and
selecting, according to a result of determination, a dispatch vehicle to dispatch to the route reserved by the reservation holder, from among the plurality of vehicles,
wherein the selecting of the dispatch vehicle comprises selecting, as the dispatch vehicle, a first vehicle having installed therein a first device having a camera configured to support sign language communication between the reservation holder and the sign language operator in a case in which it is determined that there is a sign language operator, and selecting, as the dispatch vehicle, a second vehicle having installed therein a second device having a writing device configured to support non-sign language communication between the reservation holder and the remote operator in a case in which it is determined that there is no sign language operator.

10. The non-transitory computer readable medium according to claim 9, wherein
the first device or the second device is installed to be useable at one or more seats in the dispatch vehicle, and
the operations further comprise:
determining whether the reservation holder has boarded the dispatch vehicle; and
in a case in which it is determined that the reservation holder has boarded the dispatch vehicle, outputting guidance for the reservation holder to sit in a seat at which the first device or the second device is useable.

11. The non-transitory computer readable medium according to claim 10, wherein the determining comprises recognizing, using facial recognition, one or more passengers who board the dispatch vehicle and determining, based on a result of recognition, whether the reservation holder has boarded the dispatch vehicle.

12. The non-transitory computer readable medium according to claim 10, wherein
the attribute of the reservation holder included in the reservation data registers a level of hearing loss of the reservation holder, and
the operations further comprise:
identifying, in a case in which it is determined that the reservation holder has boarded the dispatch vehicle, the level of hearing loss of the reservation holder, based on the reservation data; and
adjusting an output format of the guidance according to the identified level of hearing loss.

13. The non-transitory computer readable medium according to claim 12, wherein
the guidance is audio guidance, and
the adjusting of the output format comprises increasing volume of the audio guidance as the level of hearing loss is higher.

14. The non-transitory computer readable medium according to claim 13, wherein the guidance is guidance by characters or signs, and
the adjusting of the output format comprises lengthening a display time or increasing a number of instances of display of the guidance by characters or signs as the level of hearing loss is higher.

15. An operation management method for operating a plurality of vehicles by autonomous driving, operation management method comprising:
identifying, by a processor, whether a reservation holder who has reserved a route on which the plurality of vehicles is operated is a hearing-impaired person, based on reservation data including an attribute of the reservation holder;
determining by the processor, upon identifying that the reservation holder is a hearing-impaired person, whether there is a sign language operator capable of sign language among one or more remote operators who perform remote monitoring operations for each vehicle, based on operator data including an attribute of each of the one or more remote operators; and
selecting by the processor, according to a result of determination, a dispatch vehicle to dispatch to the route reserved by the reservation holder, from among the plurality of vehicles;
wherein the selecting of the dispatch vehicle comprises selecting by the processor, as the dispatch vehicle, a first vehicle having installed therein a first device having a camera configured to support sign language communication between the reservation holder and the sign language operator in a case in which it is determined that there is a sign language operator, and selecting, as the dispatch vehicle, a second vehicle having installed therein a second device having a writing device configured to support non-sign language communication between the reservation holder and the remote operator in a case in which it is determined that there is no sign language operator.

16. The operation management method according to claim 15, wherein
the first device or the second device is installed to be useable at one or more seats in the dispatch vehicle, and
the operation management method further comprises:
determining, by the processor, whether the reservation holder has boarded the dispatch vehicle; and
in a case in which it is determined that the reservation holder has boarded the dispatch vehicle, outputting, by the processor, guidance for the reservation holder to sit in a seat at which the first device or the second device is useable.

17. The operation management method according to claim 16, wherein the determining of whether the reservation holder has boarded the dispatch vehicle comprises recognizing by the processor, using facial recognition, one or more passengers who board the dispatch vehicle and determining based on a result of recognition.

\* \* \* \* \*